United States Patent [19]
Blood et al.

[11] 3,879,446
[45] Apr. 22, 1975

[54] PREPARATION OF UNSATURATED ORGANIC COMPOUNDS BY OXIDATIVE DEHYDROGENATION

[75] Inventors: Alden E. Blood; Hugh J. Hagemeyer, Jr., both of Longview, Tex.

[73] Assignee: Eastman Kodak Company, Rochester, N.Y.

[22] Filed: Nov. 21, 1972

[21] Appl. No.: 308,385

Related U.S. Application Data

[63] Continuation of Ser. No. 830,628, June 5, 1969, abandoned, which is a continuation-in-part of Ser. No. 388,196, Aug. 7, 1964, abandoned.

[52] U.S. Cl.... 260/486 D; 260/290 V; 260/346.1 R; 260/346.8; 260/404; 260/405.5; 260/465 R; 260/465.9; 260/479 R; 260/526 N; 260/537 N; 260/561 N; 260/592; 260/593 R; 260/601; 260/654 D; 260/666 P; 260/668 D; 260/669 R; 260/683 R
[51] Int. Cl............................................. C07c 69/54
[58] Field of Search........ 260/486 D, 526 N, 561 N, 260/479 R, 405.5

[56] References Cited
UNITED STATES PATENTS

| | | | |
|---|---|---|---|
| 2,921,101 | 1/1960 | Magovern | 260/680 |
| 3,207,806 | 9/1965 | Bajars | 260/680 |
| 3,207,810 | 9/1965 | Bajars | 260/680 |
| 3,247,273 | 4/1966 | Mantell et al. | 260/699 |
| 3,260,767 | 7/1966 | Bajars | 260/680 |
| 3,278,626 | 10/1966 | Bajars | 260/680 |

*Primary Examiner*—Lorraine A. Weinberger
*Assistant Examiner*—Paul J. Killos
*Attorney, Agent, or Firm*—Edward R. Weber; Daniel B. Reece, III

[57] ABSTRACT

Ethylenically unsaturated organic compounds are prepared by the oxidative dehydrogenation of an organic compound precursor containing at least two adjacent carbon atoms, each of which carbon atoms contains at least one hydrogen atom, by a process which comprises contacting a mixture comprising organic precursor, a catalyst consisting essentially of aqueous solutions of hydrogen iodide hydrate, and oxygen in the vapor phase at elevated temperatures. The organic precursor and catalyst are heated to the reaction zone threshold temperature prior to admixing with oxygen and the subsequent introduction of the reactants into the reaction zone. The reaction is characterized by an essentially iodinefree vaporized reactor effluent. Typical process include the conversion of methyl isobutyrate to methyl methacrylate and the conversion of ethyl benzene to styrene.

15 Claims, 1 Drawing Figure

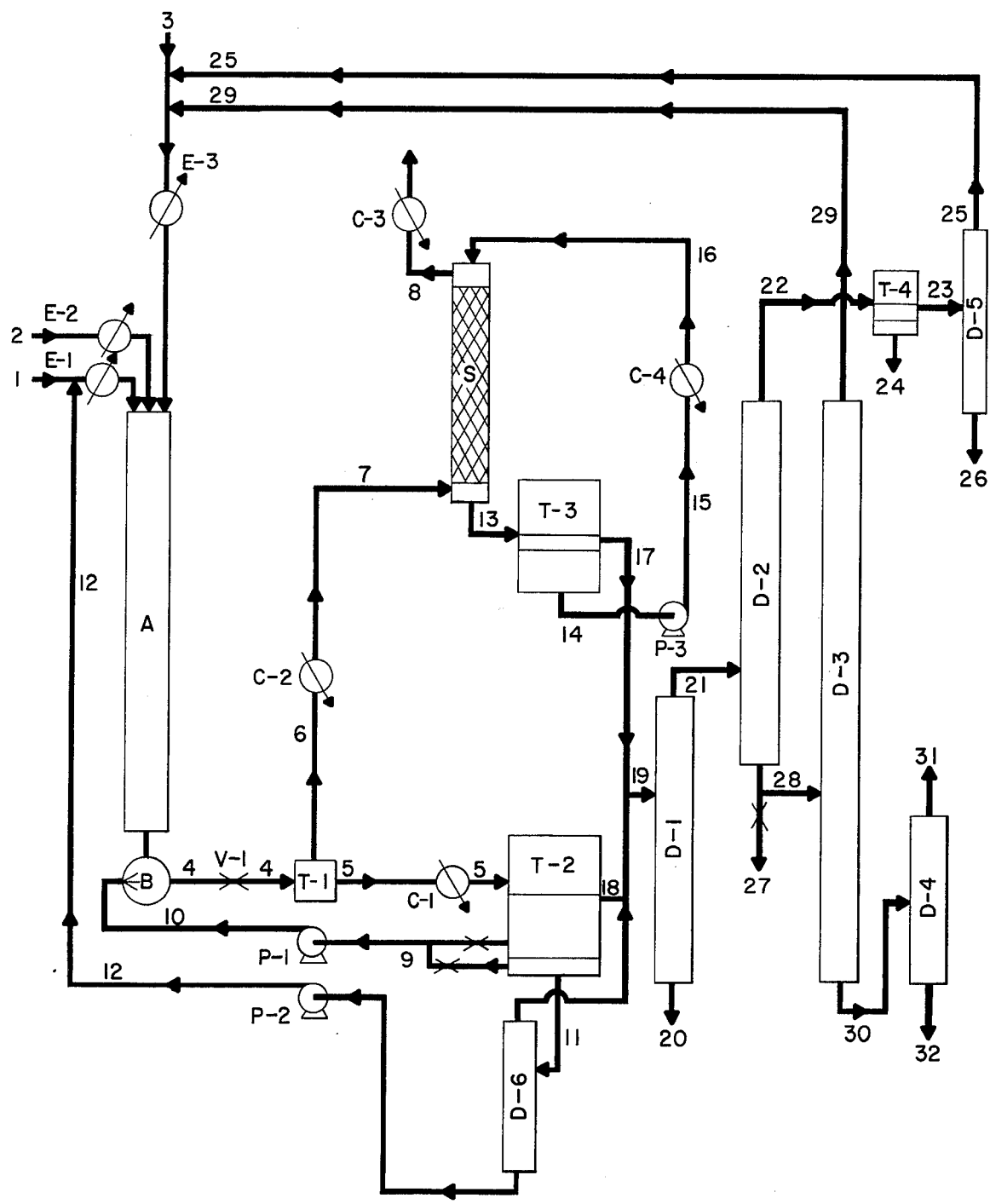

PREPARATION OF UNSATURATED ORGANIC COMPOUNDS BY OXIDATIVE DEHYDROGENATION

This application is a continuation of copending application Ser. No. 830,628, filed June 5, 1969, now abandoned, which is a continuation-in-part of application Ser. No. 388,196, filed Aug. 7, 1964, now abandoned.

This invention relates to the preparation of unsaturated organic compounds. More particularly, this invention relates to novel oxidative dehydrogenation processes for the conversion of organic compounds to other compounds having a higher carbon:hydrogen ratio.

It is well known that organic compounds can be dehydrogenated to other compounds having a higher carbon:hydrogen ratio. Various methods have been proposed for converting organic compounds containing at least one

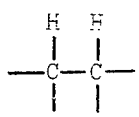

grouping to other organic compounds containing ethylenic unsaturation. Generally, these methods involve high temperature, vapor phase contact of the feed reactants with certain dehydrogenation catalysts. Such processes are not free from disadvantages. These disadvantages include low yields, low conversions, rapid decrease in catalyst activity, inability to maintain initial yields for sufficiently long periods of time to make the process economically attractive, etc. Among the more promising dehydrogenation processes which have been developed are those which include the use of iodine or iodine-containing compounds as a catalyst/reactant.

Typical of the iodine-based processes is that described in U.S. Pat. No. 2,719,171. In this process organic compounds, oxygen and iodine or an iodine-containing compound which will liberate iodine in situ are heated in the vapor phase under essentially anhydrous conditions for the production of compounds having a higher carbon:hydrogen ratio than the precursor organic reactant.

Despite its promise, the process of the above patent has a number of disadvantages which seriously reduce the commercial utility of the process. The process produces a number of co-products. For example, when methyl isobutyrate is used in the process to produce methyl methacrylate, a considerable amount of methyl acrylate is produced as well as a considerable amount of unidentified low boiling compounds. This lowers the yield to methyl methacrylate and complicates the isolation and purification of the desired methyl methacrylate. In addition, iodine is present in the reaction effluent as a mixture of free iodine and hydrogen iodide no matter whether iodine, hydrogen iodide, or an alkyl iodide is used as the catalyst. This situation leads to serious consequences. Our investigation of the process shows that an appreciable amount of the free iodine in the reaction effluent is swept out of the system by the off-gas. When air is used, the volume of off-gas is so large that it is not possible to recover the iodine economically. If pure oxygen is used instead of air to reduce the volume of off-gas, it is very difficult to keep the unit from exploding. It is apparent that the loss of iodine seriously affects commercial use of the process. The presence of iodine in the reactor effluent also complicates the purification and recovery of the product monomer and the catalyst. The suggestion in U.S. Pat. No. 2,719,171 that the iodine be separated by extraction with aqueous sodium thiosulfate or potassium iodide is not practical. Also, if distillation of the iodine-containing solutions is attempted, the iodine sublimes which complicates the recovery process. The hydrogen iodide in the reactor effluent must be recovered by still different means than the procedure devised for iodine, and then it must be combined with the recovered iodine for reuse.

Similarly, in U.S. Pat. No. 2,921,101, free iodine is employed in concentrations of at least 25 percent by weight in an oxidative dehydrogenation process and it is necessary to employ extensive equipment and processing to remove the free iodine from the unsaturated product. The hydrogen iodide vapor stream also employed in that process has a concentration of at least 65 percent hydrogen iodide which is well beyond the range of concentration which can be employed in the processes of the present invention.

We have discovered that certain of the disadvantages residing in oxidative dehydrogenation processes using iodine-based catalyst systems can be substantially reduced or eliminated by the use of hydrogen iodide hydrate solutions as a catalyst for the catalytic dehydrogenation of organic compounds to directly produce iodine-free organic products having a lesser saturation.

In general terms, this invention provides an improved process for iodine-effected dehydrogenation of organic compounds containing at least one

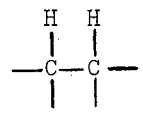

grouping which comprises (1) heating a mixture comprising organic precursor and a catalyst consisting essentially of an aqueous solution of hydrogen iodide hydrate to a temperature of about 300°C to about 400°C. and (2) contacting the heated mixture with oxygen or an oxygen-containing gas such as air at a temperature in the range of about 400°C. to about 750°C.

Hydrogen iodide hydrate is a different material from hydrogen iodide. Hydrogen iodide is defined in Webster's New International Dictionary of the English Language, Second Edition, Unabridged, page 1219, as follows: "Hydriodic acid is a gas resembling hydrochloric acid, but is much less stable, and is a strong reducing agent — called also hydrogen iodide." The physical properties of hydrogen iodide are given in the Encyclopedia of Chemical Technology, Volume 7, page 951, as follows: "Hydrogen iodide, HI, is a colorless gas which fumes strongly in moist air, m.p. −50.8°C., b.p. −35.3°C." Also, Mellor, A Comprehensive Treatise on Inorganic and Theoretical Chemistry, Volume 2, 1922, page 185, shows that hydrogen iodide hydrates are formed by hydrogen iodide in aqueous solution, at least three hydrates being distinguishable.

The physical difference between hydrogen iodide and the hydrogen iodide hydrates, referred to herein as "hydrogen iodide hydrate", appear as obvious. While the physical difference might be considered obvious, we have discovered chemical differences which are not obvious when these materials are used as catalysts for dehydrogenation or organic compounds in the presence of oxygen. These differences can be summarized as follows: When iodine, hydrogen iodide, or an alkyl iodide are used as the catalyst in the mentioned processes, large amounts of by-products and co-products are produced, the reaction effluent contains iodine and hydrogen iodide and iodine loss in the off-gas is very high. Also, there is a chemical change in the catalyst fed, e.g., iodine is partly converted to hydrogen iodide, hydrogen iodide is partly converted to iodine, and alkyl iodides are converted to mixtures of iodine and hydrogen iodide.

According to the process of our invention, when hydrogen iodide hydrate is used as the catalyst under the conditions described below, very little or no by-products and co-products are produced, the reaction effluent does not contain iodine, no iodine is lost in the off-gas and the catalyst is recovered as hydrogen iodide hydrate solution which can be recycled.

From an investigation of the mechanism of the process, particularly to account for the fact that free iodine is not present, it was observed that it is a well-known fact that hydrogen iodide and oxygen or air react at elevated temperatures to form water and iodine. In our process employing hydrogen iodide hydrate, there is preferably present a substantial excess of oxygen based on the amount of hydrogen iodide hydrate employed. However, no free iodine is produced.

In our process the oxygen appears to combine directly with the hydrogen released from the organic compound to form water. In the prior processes described above, the hydrogen reacts with the iodine to obtain hydrogen iodide which reacts with the oxygen to give iodine and water. This leads us to believe that we have discovered in hydrogen iodide hydrate a new oxygen carrier for oxidation reactions and for oxidative dehyrogenation in particular. It is our belief that hydrogen iodide hydrates are probably converted to a complex with oxygen in the presence of the organic compound under the conditions of the reactions. This is analogous to the known reaction of periodic acid with water to combine more oxygen with iodine. For example, it is possible to have as many as six atoms of oxygen in combination with a single atom of iodine.

According to the oxidative dehydrogenation process of our invention, organic compounds capable of being dehydrogenated are heated in the presence of oxygen and aqueous hydrogen iodide hydrate solutions containing from 2 to 60 percent hydrogen iodide (as HI), in the absence of free iodine, as opposed to hydrogen iodide, per se, preferably in the vapor phase, for the preparation of unsaturated products.

The process is not to be confused with the abovedescribed processes using iodine and at least 65 percent hydrogen iodide which yield product contaminated with free iodine.

It was particularly surprising and unexpected to discover that the manner or sequence in which the organic feed compound, catalyst solution and oxygen-containing gas are brought into contact with each other is important to obtaining as essentially iodine-free organic product having a higher C:H ratio. Thus, it is a particular feature of the invention that the organic feed compound and the aqueous catalyst solution are first heated, either separately or together, to a temperature in the range of about 300° to about 400°C. before introducing these materials into the reaction zone which is maintained at a temperature in the range of about 400° to about 750°C. or higher, where the vaporized organic feed and catalyst solution are contacted with oxygen. Caution should be exercised in the preheat of the organ reactant and catalyst solution in order to minimize charring, burning or decomposition. Thus, it is preferred to preheat the organic compound to a temperature sufficient to vaporize the compound prior to introducing the vaporized compound into the preheat or mixing section of the main reactor, said section being maintained at a temperature level corresponding to that of the organic compound. The catalyst solution can be preheated to a higher temperature but below 400°C. and introduced into the preheat or mixing zone of the main reactor at a temperature level corresponding to that of the vaporized catalyst solution. The vaporized orgainic compound and catalyst solution are allowed to mix before entering the reaction zone, which is maintained at a temperature in the range of about 400° to about 750° C., preferably between about 400° to about 600°C., where the heated vaporized mixture is contacted with oxygen. The oxygen must not be brought into contact with the organic compound-catalyst mixture until the temperature of the mixture has approached the actual reaction temperature.

In carrying out the oxidative dehydrogenation process of the invention the reactants are preferably vaporized by heating and passed into the reaction zone for reaction under atmospheric pressure although the system may be maintained under low pressure if desired. For example, useful results are obtained with 10–200 psig. reactor exist pressure, yields and conversions often being increased by reaction under pressure, in part depending upon the particular reactants in use. Thus, a 15 percent conversion at 0 psig. can increase to about 25 percent at 10 psig. The examples below illustrate methods involving vaporizing hydrogen iodide hydrate solution and an organic compound such as methyl isobutyrate and passing them with air into a reaction zone heated to about 500°–700°C. or higher, preferably 500°–550°C., depending on the stability of the organic compound. The gas flow through the system may be at a space velocity of about 300–5000. If desired, the reactants can be added to the reactor at the same or different points in the reactor section. Following reaction, the gaseous stream can be quenched in water, preferably at once, and the unsaturated iodine-free product separated. Unreacted organic compound and hydrogen iodide hydrate in aqueous solution can be recycled from the quenching zone to the reactor together with fresh hydrogen iodide hydrate solution and organic compound as needed. At no point in the reactor is free iodine detected, the crude vaporized product direct from the reaction zone being free of iodine.

The temperature in the reactor at a point where the preheated reactants are in contact with each other is important in order to prevent decomposition. Ordinarily, temperatures in excess of about 700°C. will cause decomposition of the organic compound. For example, at elevated temperatures aliphatic hydrocarbons may undergo cracking. For esters, a range of about 450°–650°C. is suitable.

The residence time in the reactor can be about 0.1 to 10 seconds, preferably 0.5 to 3 seconds. If the reactor is packed, linear velocity is not important; if not packed, a linear velocity above about 25 ft./sec. is necessary to give efficient mixing of the reactants.

In preparing the hydrogen iodide hydrate, it is satisfactory to pass hydrogen iodide into water to obtain a solution of hydrogen iodide hydrate in water. The concentration of the hydrogen iodide can be varied as is convenient. Concentrations of 5 to 20 percent (as HI) are preferred, particularly concentrations in the range of 8 to 15 percent. At concentrations of less than 5 percent there is sufficient water added to the reactor that appreciable reactor volume is used by water vapor and the reactor capacity is reduced. At concentrations greater than about 60 percent the hydrogen iodide hydrate is unstable, and it is difficult to handle. The water solution of hydrogen iodide may be premixed or it may be prepared in situ by feeding water and hydrogen iodide separately to the reactor. The hydrogen iodide concentration in the reactor can be varied from about 0.5 to 10 percent, preferably about 1 to 6 percent based on the weight of organic material used such as methyl isobutyrate; however, even at such low hydrogen iodide concentration very little cracking or carbon-carbon scission is observed. In other processes the dehydrogenation of hydrocarbons, e.g., U.S. Pat. No. 2,890,253, iodine must be used in amounts generally between 25 percent and 1000 percent by weight of iodine based on the organic feed to prevent cracking. In the processes of our invention, this is obviated by use of hydrogen iodide hydrate solution containing sufficient water, i.e., about 5–20 percent aqueous solution. The ratio of organic compound such as methyl isobutyrate to oxygen in the reactor feed can be varied widely. For example, ratios of from 1:1 to 10:1 mole ratio, preferably 3:1 to 8:1 using 10 percent aqueous hydrogen iodide hydrate catalyst at 2 percent level as HI in the reactor based on the organic compound give very good yields of unsaturated product.

The process of this invention can be applied to the oxidative dehydrogenation of a wide variety of organic compounds including cyclic and open-chain compounds which are characterized in general by the presence in their molecules of two adjacent carbon atoms each of which contains at least one hydrogen atom. Such compounds normally will contain from 2 to 20 carbon atoms, at least one

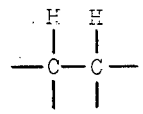

grouping, i.e., adjacent carbon atoms each containing at least one hydrogen atom, a boiling point below about 350°C. and such compounds can contain oxygen, halogens, nitrogen and sulfur in addition to carbon and hydrogen. The process is particularly effective in the dehydrogenation of organic compounds having from 3 to 10 carbon atoms wherein the

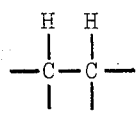

group is ethyl or isopropyl, i.e., —$CH_2$—$CH_2$— or —$CH_2$—$CH(CH_3)$—. Among the classes of organic compounds which can be dehydrogenated by means of the novel process of this invention are alkanes, alkenes, alkyl halides, ethers, esters, aldyhydes, ketones, organic acids and anhydrides, alkyl aromatic compounds, alkyl heterocyclid compounds; cyanoalkanes, cycloalkanes and the like. The invention is particularly suitable for the following conversion reactions.

ESTERS

The process of the invention can be applied to the conversion of esters of aliphatic and aromatic mono- and polybasic acids to a corresponding ester having the same number of carbon atoms and a higher carbon:hydrogen ratio. The esters should contain at least two adjacent carbon atoms each containing at least one hydrogen atom, such as an alkyl group of at least two carbon atoms. In the aliphatic series, the alkyl group is preferably attached to the acyl group.

The preferred organic esters have the general formula

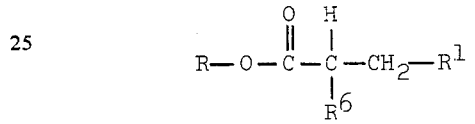

wherein R is alkyl of 1 to 8 carbon atoms, preferably 1 to 4 carbon atoms, phenyl or cyclohexyl; $R^1$ is hydrogen or alkyl of 1 to 9 carbon atoms; and $R^6$ is hydrogen or alkyl of 1 to 2 carbon atoms. The lower alkyl esters of the lower aliphatic monobasic acids having, in the acid moiety, from 3 to 12 carbon atoms, such as methyl and hexyl esters, are especially useful in the process. Thus the process can be used to convert methyl isobutyrate to methyl methacrylate; methyl propionate to methyl acrylate; ethyl propionate to ethyl acrylate; methyl 2-methylpentanoate to methyl 2-methylpentenoate; methyl 2-ethylhexanoate to methyl 2-ethylhexenoate; ethyl acetate to vinyl acetate; ethyl isobutyrate to ethyl methacrylate; phenyl isobutyrate to phenyl methacrylate; hexyl propionate to hexanyl acrylate; cyclohexyl butyrate and isobutyrate to cyclohexyl butenoate and methacrylate, respecitvely; and phenyl propionate to phenyl acrylate. In general, the higher esters tend to form not only the less saturated ester but also acids and olefins, e.g., isobutyl isobutyrate forms not only methallyl methacrylate but also good yields to isobutylene and methacrylic acid.

HYDROCARBONS

Aliphatic or aryl hydrocarbons containing at least two adjacent carbons, each containing at least one hydrogen, such as an alkyl group of at least two carbon atoms, are suitable feeds for the process. Particularly preferred hydrocarbon feed materials include alkanes having from 2 to 8 carbon atoms such as ethane, propane, isobutane, octane, etc.; alkenes having from 4 to 8 carbon atoms, such as butene and 2-methylbutene; aromatic hydrocarbons substituted with one to three alkyl groups, preferably wherein the alkyl substituent(s) contain 2 or 3 carbon atoms such as ethylbenzene and diethylbenzene; and alicyclic hydrocarbons, including alkyl substituted materials such as ethylcyclohexane. Examples of suitable hydrocarbon feed materials and their conversion product include ethylbenzene to sytrene: cumene to α-methylstyrene; cyclohexane to benzene; ethylcyclohexane to styrene; isobutane to isobutylene; propane to propylene; butene-1 to butadiene; 2-methylbutene-1 to isoprene; and diethylbenzene to divinylbenzene. When the product is a gas at operating conditions it can be recovered from the off-gas stream by adsorption or distillation rather than from the decanter as is done for water-insoluble liquid product.

KETONES

Ketones containing at least two adjacent carbon atoms, each of which carbons contain at least one hydrogen, such as ketones containing an alkyl group of at least two carbon atoms, are also suitable feeds for the process. Preferred ketones have the general formula

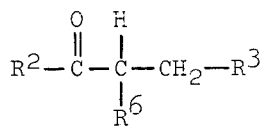

wherein $R^2$ may be alkyl of 1 to 8 carbon atoms, preferably 1 to 4 carbon atoms, cyclohexyl or phenyl and $R^3$ may be hydrogen or alkyl of 1 to 6 carbon atoms, preferably 1 to 2 carbon atoms; and $R^6$ is hydrogen or alkyl of 1 to 2 carbon atoms. Exemplary ketones and their conversion products include methyl ethyl ketone to methyl vinyl ketone; diethyl ketone to divinyl ketone and ethyl vinyl ketone; cyclohexyl methyl ketone to acetophenone; methyl isopropyl ketone to methyl isopropenyl ketone and propiophenone to vinyl phenyl ketone.

Many of the ketone products have high water solubility. The process is modified in these cases in that the product is removed as a single phase mixed with catalyst from the Decanter T-2, described below, or distillation in Still D-1, catalyst being recovered from Line 20 for recycle. The organic product is recovered from the top of Still D-1 and is processed by the normal procedure. An alternative procedure useful in some cases is to extract the organic product from the water solution in T-2.

ACIDS AND AMIDES

Acids and amides having at least two aliphatic adjacent carbon atoms, each containing at least one hydrogen atom, such as those containing an alkyl chain of at least two carbon atoms, are suitable feeds for the process. Preferred compounds of these types have the general formula

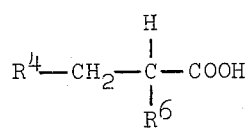

and

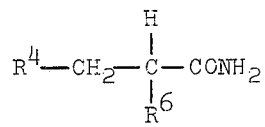

wherein $R^4$ is alkyl of 1 to 9 carbon atoms and preferably 1 to 5 carbon atoms, and $R^6$ is hydrogen or alkyl of 1 to 2 carbon atoms. Exemplary of the carboxylic acids suitable in the process and their conversion products are propionic acid yielding acrylic acid, isobutyric acid yielding methacrylic acid, succinic acid yielding maleic acid, 2-ethylhexanoic acid yielding 2-ethyl-hexenoic acid, butyric acid yielding crotonic acid, etc. Amides corresponding to the acids are also useful giving the amide of the unsaturated acid. In many cases, the amides are solids at ambient temperature so that recovery is frequently possible by a simple filtration of the quench solution from Decanter T-2. Water-soluble amides such as acrylamide are recovered from the Decanter T-2 by extraction.

ANHYDRIDES

Anhydrides of the acids are also useful in the process for producing the corresponding unsaturated anhydrides, e.g., succinic anhydride yielding maleic anhydride.

NITRILES

Nitriles containing at least two adjacent carbon atoms, each containing at least one hydrogen, are useful in the process. Preferred compounds include those nitriles having the general formula

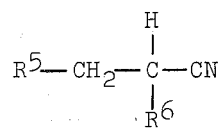

wherein $R^5$ is hydrogen or an alkyl group of 1 to 5 carbon atoms, and $R^6$ is hydrogen or alkyl of 1 to 2 carbon atoms. Cyclic nitriles such as cyclohexene nitrile are also quite readily converted nitriles having a higher degree of unsaturation. The nitriles corresponding to the previously described carboxylic acids, amides and acid anhydrides are especially useful in the process, in particular propionitrile (acrylonitrile); isobutyronitrile (methacrylonitrile) and cyclohexenenitrile (benzonitrile). In general, there are fewer exceptions and problems with the nitriles since they are water insoluble and they are liquids. Conversions and yields are excellent.

OTHER COMPOUNDS

In general, compounds containing the two adjacent carbon atoms and stable at the temperature employed in the process can be used in the process. Thus, compounds such as aldehydes (butyraldehyde, succinaldehyde, etc.), heterocyclics (2-ethylfuran, α-ethylpyridine, etc.) give corresponding unsaturated compounds.

DRAWING

The accompanying drawing is a flow diagram illustrating the process of our invention. In a representative process shown in the drawing, hydrogen iodide hydrate catalyst solution and organic compound, preheated separately to above 300°C., and air or oxygen, which may also be preheated, are passed into the reactor A as shown, heated to a temperature above 400°C., the materials being held in the reaction zone at this temperature for only a short time, for example, a residence time of one second. The effluent passes from the reactor A and preferably is rapidly quenched at B by use of water, hydrogen iodide hydrate solution or unsaturated product recycling from Decanter T-2 to the quench zone. The quenched product flows from B into the Decanter T-2 where the crude unsaturated organic product, if insoluble in water or the aqueous hydrogen iodide hydrate solution, separates out usually as supernatant liquid and is decanted off through line 18 for purification as will be described in more detail below. The iodine-free aqueous hydrogen iodide hydrate solution at the bottom of the Decanter T-2 is recycled back to the reactor. If the unsaturated product is soluble in the quench solution, it can be separated out by distillation or extraction. The off-gas passes from the system through a Cooler C-2 thence to water scrubbers for recovery of residual organic material. Line 29 carries unreacted organic compound and Line 25 carries organic iodide back to the reactor from the distillation section.

The reactor shell may be carbon steel or stainless steel. In order to reduce carbonization of the organic material the lining of the reactor and other process equipment in contact with the process stream should be composed of non-oxidizing material. Suitable materials are silica-coated steep pipe, fused silica pipe, Vycor (silica) pipe, or pipe lined with boron carbide, boron nitride, silicon carbide, Carborundum (containing silicon carbide) and other oxide-free materials. The reactor can be empty or packed with the same material as the lining, e.g., in the form of Raschig rings.

The hydrogen iodide hydrate concentration of the solution in the Decanter T-2 should be maintained below about 30 percent, preferably in the range of 5 to 15 percent so that the unsaturated organic product such as methyl methacrylate will not dissolve in the solution and can be decanted off. In those cases where the unsaturated product is soluble in water or in hydrogen iodide hydrate solution in the Decanter, the concentration of the hydrogen iodide hydrate therein is not as critical since the dissolved product will be separated out by distillation, extraction or some other method.

The process will now be described in more detail with reference to the drawing, particularly as applied to the production of unsaturated aliphatic esters such as methyl methacrylate by dehydrogenation of the corresponding saturated esters such as methyl isobutyrate.

Methyl isobutyrate fed to reactor A through Line 3 can contain small amounts of isobutyric acid and water but should contain about 98 percent of the ester. Air fed through Line 2 should be free of oil but need not be dried. The hydrogen iodide hydrate catalyst solution fed through Line 1 may contain about 20 percent hydrogen iodide by weight. The recycle catalyst solution fed through Line 12 may contain aqueous hydrogen iodide solution. The feeds through Lines 1, 2, and 3 are preheated to above 300°C., the reactor being heated to 500°–580°C. and a pressure of 60 psig. is maintained in the reactor with a contact time of about 1.3 seconds. A concentration of about 4 percent hydrogen iodide based on the methyl isobutyrate is used and air is supplied to the reactor to maintain a 6:1 molar ratio of ester to oxygen. The temperature of the quench solution in Decanter T-2 is maintained at 15°–20°C. The temperature of the water scrub solution in Decanter T-3 is maintained at 5°–8°C. Distillation Columns D-1, D-2, D-3 and D-4 are operated under vacuum. The base temperature of Column D-1 is not allowed to exceed 127°C. The base temperature of Columns D-2 and D-3 is not allowed to exceed 80°C. The base temperature of Column D-4 is not allowed to exceed 60°C. Fresh methyl isobutyrate from Line 3 and recycle methyl isobutyrate from Line 29 are vaporized and preheated to about 300°C. in Heater E-3. Air supplied from a blower is preheated as required in Heater E-2. Fresh catalyst from Line 1 and catalyst from Line 12 are vaporized and preheated to about 300°C. in Heater E-1. The three feeds are conducted to the reactor (A) in the ratios previously specified where they are heated together at 500°–580°C. for 1.3 seconds at a pressure of 60 psig. The reactor effluent is rapidly quenched (B) with chilled organic crude product from Decanter T-2. The condensed reactor effluent passes through Line 4 through Pressure Control Valve V-1 into a liquid-gas separator (T-1) where the off-gas disengages and is removed through Line 6. The liquid passes through Line 5 into Chiller C-1 where it is cooled to 15°–20°C. with glycol. From the Chiller (C-1), the cooled liquid flows through Line 5 into Decanter T-2. The off-gas removed via Line 6 is chilled in a glycol cooler (C-2) and is then passed via Line 7 into a chilled water countercurrent scrubber (S) where it is scrubbed with cold water (5°C.). The off-gas disengages in the top of Scrubber S and is then passed via Line 8 through a glycol-chilled cooler (C-3), after which it is discharged. It is at this point that off-gas samples are collected for analysis. The water scrub solution in Scrubber S flows via Line 13 into Decanter T-3 where the organic and scrub water solution separate. The scrub water solution flows through Line 14 into Pump P-3 which sends it via Line 15 into a glycol-chilled cooler (C-4) after which Line 16 conducts it back to the Scrubber (S) for recycle. The organic phase from the Decanter (T-3) is conducted to the recovery system via Line 17. The liquid flowing into Decanter T-2 from the reactor separates into an upper organic layer and a lower catalyst layer. The lower catalyst layer is essentially unchanged hydrogen iodide hydrate catalyst solution containing 2–3 percent organic ester and acid. This recovered catalyst is removed via Line 11, stripped of organic compounds and in Column D-6 fed to Pump P-2 which returns it as recycle catalyst feed via Line 12. The removal of organic ester from the hydrogen iodide hydrate solution prevents the formation of coke and tars in the reactor. The organic layer in Decanter T-2 contains methyl isobutyrate, methyl methacrylate, methanol, acetone, methyl iodide, isobutyric acid and methyl acrylate. The methanol and isobutyric acid arise from hydrolysis in the quench (B) and Decanter (T-2). The methyl iodide arises from reaction of the methanol with the hydrogen iodide hydrate. Typical concentrations found in the Decanter (T-2) organic layer are 1–2 percent of the methanol, acetone, and methyl iodide mixture (in about equal amounts), 20–30 percent methyl methacrylate, 0.1–0.3 percent methyl acrylate, 2 percent isobutyric acid, and the remainder methyl isobutyrate. The crude organic layer in Decanter T-2 is partly removed via Line 9 to Pump P-1 which recycles it via Line 10 as fresh quench liquid (B). The remainder is removed via Line 18 and is mixed with organic from Line 17 (recovered from Decanter T-3). The total organic crude is conducted to the recovery system via Line 19 to Distillation Column D-1. Distillation Column D-1 is a 40-foot packed column operating at a 0.5:1 reflux ratio. Isobutyric acid and hydrogen iodide hydrate are removed from the bottom via Line 20. This mixture is processed (not shown) for recovery of the hydrogen iodide and conversion of the isobutyric acid to methyl isocutyrate. The hydrogen iodide hydrate is produced by distillation of catalyst solution physically carried into the column by entrainment. The base of Column D-1 is not allowed to exceed 127°C. (the boiling point of hydrogen iodide-water) in order to prevent catalyst carryover into the rest of the recovery system. The overhead from Distillation Column D-1 is conducted via Line 21 to Distillation Column D-2. Column D-2 is a 60-foot packed column which removes water and low-boiling products overhead. The overhead from Column D-2 is conducted via Line 22 to Decanter T-4 where water is separated and discharged via Line 24. The organic phase from Decanter T-4 is conducted via Line 23 into Distillation Column D-5 where methyl iodide is removed overhead and is conducted via Line 25 to Line 3 where it is blended with methyl isobutyrate feed to the reactor. Methyl iodide is converted to hydrogen iodide hydrate and methanol in the reactor. Methanol, acetone, and methyl acrylate are removed from the base of Column D-5 via Line 26 for processing (not shown) to recover methanol.

The base product from Column D-2 is a clean, dry mixture of methyl iosbutyrate and methyl methacrylate. The mixture can be removed via Line 27 for processing according to the teachings of U.S. Pat. No. 3,062,872 or it can be conducted via Line 28 to Distillation Column D-3. Distillation Column D-3 is a 100-plate sieve tray column operating at a 4:1 reflux ratio. Methyl isobutyrate containing ca. 0.2 percent methyl methacrylate is removed overhead and recycled to the reactor as feed via Line 29. Methyl methacrylate is removed from the base of Column D-2 via Line 30 and is fed into Column D-4. Distillaion Column D-4 is a short flash column to remove color and polymer. Pure colorless methyl methacrylate is removed overhead via Line 31. Small amounts of polymer are removed from the base via Line 32 for depolymerization. When the unsaturated product boils at a higher temperature than the unreacted feed (for example, methyl methacrylate from methyl isobutyrate), then the recovered feed is recycled back to the reactor through Line 29 and the product is removed through Line 30. When the product boils at a lower temperature than the feed (for example, methacrylonitrile from isobutyronitrile), then the recovered feed is recycled back to the reactor through Line 30 and the product is recovered through Line 29.

The following examples will serve to illustrate the processes of our invention and to distinguish them from prior art processes of oxidative dehydrogenation in which free iodine is present.

EXAMPLE 1 - Use of $I_2$

This example illustrates the results obtained when the process described in Example 2 of U.S. Pat. No. 2,719,171 is carried out. Methyl isobutyrate containing 2.0 percent iodine together with air is passed through a Vycor (silica) tube heated to 550°C. The tube is packed with Vycor chips to improve heat transfer. The ratio of air to methyl isobutyrate is such as to give 0.5 mole of oxygen per mole of methyl isobutyrate. The reaction mixture is passed through the tube at a space velocity of 236 (ml. of gaseous reactants at standard temperature and pressure per ml. of reactor per hour). The reaction products are passed through a chilled condenser. The off-gas is scrubbed with standard sodium thiosulfate solution. The liquid product, by gas chromatographic analysis, contains 16 percent methyl methacrylate, 7 percent methyl acrylate, 11 percent unidentified low boiling compounds, and the remainder unreacted methyl isobutyrate. The conversion to methyl methacrylate is 15 percent. The yield to methyl methacrylate is 50 percent. The $HI:I_2$ ratio (by weight) in the products is 1:1. The off-gas contains 16 percent of the recovered iodine values. Total iodine value recovery is 60 percent (partly as iodide and iodate salts).

EXAMPLE 2 - Use of $I_2$ at Higher Temperatures

The process of Example 1 is repeated in all particulars except that the tube is heated to 610°C. Chromatographic analysis of the liquid product shows 19 percent methyl methacrylate, 8 percent methyl acrylate, 13 percent unidentified low boiling compounds, and the remainder unreacted methyl isobutyrate. The conversion to methyl methacrylate is 17 percent. The yield to methyl methacrylate is 47 percent. The $HI:I_2$ ratio in the produce is 1:2. The off-gas contains 44.2 percent of the recovered iodine values. Total iodine value recovery (partly as iodide and iodate salts) is 90 percent.

EXAMPLE 3 - Use of Anhydrous Hydrogen Iodide

This example illustrates the results obtained when hydrogen iodide is substituted for iodine in the process of Example 2. The process of Example 2 is repeated except that iodine is not added to the methyl isobutyrate. Instead, hydrogen iodide is fed from a cylinder of the gas through a rotameter into the reactor at such a rate that 2.0 percent hydrogen iodide is present in the reactor with respect to methyl isobutyrate. Chromatographic analysis of the liquid product shows 16 percent methyl methacrylate, 9 percent methyl acrylate, 16 percent unidentified low boiling products, and the remainder unreacted methyl isobutyrate. The conversion to methyl methacrylate is 14 percent. The yield to methyl methacrylate is 38 percent. The $HI:I_2$ ratio in the products is 1:1. The off-gas contains 45.0 percent of the recovered iodine values. Total iodine value recovered is 90 percent (partly as iodide and iodate salts).

EXAMPLE 4 - Use of Anhydrous Hydrogen Iodide

The process of Example 3 is carried out under conditions preferred for use in our invention, except using hydrogen iodide, not hydrogen iodide hydrate, as follows. Methyl isobutyrate is fed with hydrogen iodide (2.0 percent based on methyl isobutyrate) and air (0.2 moles of oxygen per mole of methyl isobutyrate) through a Vycor tube heated at 600°C. at a space velocity of 660. The methyl isobutyrate is preheated to 450°C. The reactor tube is packed with Vycor chips. The off-gas is not scrubbed. The reactor effluent is quenched with water, and off-gas is then passed through a chilled condenser. The liquid product is decanted from the quench water and analyzed by gas chromatography and by titration with standard sodium hydroxide and sodium thiosulfate. The quench water is analyzed by titration with standard sodium hydroxide and sodium thiosulfate. The liquid product contains 10 percent methyl methacrylate, 3 percent methyl acrylate, 4 percent unidentified low boiling products and unreacted methyl isobutyrate. The conversion to methyl methacrylate is 11.4 percent. The yield to methyl methacrylate is 61 percent. The $HI:I_2$ ratio is 6:4 in the water quench and organic products. The total iodine value recovered is 70 percent.

The following examples illustrated the use of hydrogen iodide hydrate in representative processes of the invention.

EXAMPLE 5

This example illustrates the results obtained when hydrogen iodide hydrate solution is used as the catalyst instead of hydrogen iodide as in Example 4. The experiment described in Example 4 is repeated except that instead of feeding hydrogen iodide gas into the reactor sufficient hydrogen iodide hydrate in water is dissolved in the methyl isobutyrate to give 2.0 percent hydrogen iodide hydrate (as HI) with respect to methyl isobutyrate. The reactor effluent is analyzed as before. The liquid product contains 16 percent methyl methacrylate, 2 percent low boiling unidentified products, and unreacted methyl isobutyrate. The conversion to methyl methacrylate is 18 percent. The yield to methyl methacrylate is 72 percent. No methyl acrylate is produced. The liquid product does not contain iodine as shown by the failure to obtain a blue color on addition of starch solution. Titration of the quench water shows that 95 percent of the catalyst fed to the reactor is recovered unchanged. There is only a trace of catalyst in the organic decantate. The organic decantate is distilled and pure methyl methacrylate is recovered.

EXAMPLE 6

The process described in Example 4 is repeated except that the catalyst used in Example 5 is substituted for the hydrogen iodide and the conditions of Example 2 are used. The liquid product contains 15 percent methyl methacrylate, 2 percent unidentified low boiling compounds, the remainder being unreacted methyl isobutyrate. No methyl acrylate is found. The conversion to methyl methacrylate is 13 percent. The yield to methyl methacrylate is 68 percent. No iodine is found in the products by the start test. Titration shows that 94 percent of the catalyst is recovered unchanged in the quench water.

EXAMPLE 7

The process described in Example 5 is repeated. The process is run until the quench water contains 10 percent hydrogen iodide hydrate by titration to a pH of 5 with standard sodium hydroxide. The quench water solution is then used as the catalyst. The quench water solution is not soluble in the methyl isobutyrate as is the original hydrogen iodide hydrate solution so it is added separately at such a rate as to give 2.0 percent hydrogen iodide hydrate (as HI) with respect to methyl isobutyrate. The feed rates are adjusted to maintain the same space velocity taking into account the increased water being fed to the reactor. The conversion and yield to methyl methacrylate is unchanged on using the recovered catalyst. Low boiling products remain at a low level. No methyl arcylate is produced. No iodine is produced in the reactor effluent.

EXAMPLE 8

This series of experiments is designed to show the presence or absence of iodine in an identical system when any of the three catalyst systems are used. A reactor consisting of a preheater, a reactor, and a water scrubber is used. The preheater and the reactor are made of Vycor tubing packed with Vycor chips. The bottom of the preheater is maintained at 450°C. The reactor is maintained at 600°C. The methyl isobutyrate and the catalyst are preheated. Air is used such that 0.2 mole of oxygen is fed to the reactor per mole of methyl isobutyrate fed. The space velocity is 660 for all runs. The catalyst concentrations are kept at 2.0 percent by weight iodine or hydrogen iodide based on methyl isobutyrate. Using the reactor described above at the conditions listed above, runs are made with iodine, anhydrous hydrogen iodide, and then 30 percent hydrogen iodide hydrate in the order given. Each catalyst is run for three hours and the unit is inspected for evidence of iodine. When iodine or anhydrous hydrogen iodide is used as the catalyst, the purple color of molecular iodine is visible between the preheater and the reactor. Iodine is also present in the organic product as indicated by its color and by the blue color produced when starch solution is added. When the 30 percent hydrogen iodide hydrate is used as the catalyst, there is no purple color visible between the preheater and the reactor. Also, there is no iodine present in the organic product as shown by the failure of a blue color to appear on the addition of starch solution.

EXAMPLE 9 - Conversion of Ethylbenzene to Styrene

Ethylbenzene is fed into the unit as the organic feed at the conditions described above. The ethylbenzene is converted to styrene in 28.1 percent conversion at a 78 percent yield. Over-all organic recovery is 94.5 percent. No free iodine is found in either the organic product or in the aqueous scrubber layer.

EXAMPLE 10 - Conversion of Cumene to α-Methylstyrene

Cumene is used as the organic feed to the unit under the conditions described above. The cumene undergoes a 35 percent conversion to α-methylstyrene in 85.5 percent yield. Organic recovery is 94.4 percent. No free iodine is found in the products.

EXAMPLE 11 - Conversion of Cyclohexane to Benzene

Cyclohexane is used as the organic feed at the previously described conditions. Benzene is produced in 45 percent conversion at 94 percent yield. No free iodine is found in the products.

EXAMPLE 12 - Conversion of Isobutane to Isobutylene

Using isobutane as the organic feed a 24 percent conversion and a 94 percent yield to isobutylene are obtained. Again no free iodine is found in the products.

EXAMPLE 13 - Conversion of Methyl 2-Methylpentanoate to Methyl 2-Methylpentenoate Using methyl 2-methylpentanoate at the conditions described previously results in a 26 percent conversion to methyl 2-methylpentenoate. Again no free iodine is found in the products.

EXAMPLE 14 - Conversion of Methyl 2-Ethylhexanoate to Unsaturated Esters

Using methyl 2-ethylhexanoate as the organic feed under the previous conditions gives a 24 percent conversion to methyl $C_8$ unsaturated esters. No iodine is found in the products.

EXAMPLE 15 - Conversion of Isobutyric Acid to Methacrylic Acid

Isobutyric acid fed into the unit at the described conditions gives an 18.5 percent conversion to methacrylic acid.

EXAMPLE 16 - Conversion of Butene-1 to Butadiene

Using butene-1 as the organic feed there is obtained a reaction mixture containing 17.4 percent butadiene. No free iodine is found in the products.

EXAMPLE 17 - Conversion of Isopentane to Isoprene

The dehydrogenation of isopentane is effected at 600°C. The yield to isoprene is 14.7 percent at a conversion of 5.2 percent. No free iodine is found in the product.

EXAMPLE 18 - Conversion of Propane to Propylene and Ethylene

The dehydrogenation of propane is effected at 695°C. The yield to propylene is 34.7 percent at a conversion of 8.1 percent. Ethylene is also produced at a yield and conversion of 23.4 percent and 5.3 percent, respectively. No free iodine is found in the product.

EXAMPLE 19 - Conversion of Cyclohexene to Benzene

Cyclohexene is fed as the organic reactant at conditions similar to Example 11. The product mixture contains 42.4 percent benzene. No free iodine is found in the product.

EXAMPLE 20 - Conversion of Cyclohexene Carbonitrile to Benzonitrile

The dehydrogenation of cyclohexene carbonitrile is effected at 505°C. Benzonitrile is produced at a yield and conversion of 52 percent and 26 percent, respectively. No free iodine is found in the product.

Examples 1 through 4 show that when iodine or hydrogen iodide is used as the catalyst in a process with air to produce methyl methacrylate from methyl isobutyrate the products contain iodine and hydrogen iodide as well as appreciable amounts of methyl acrylate. On the other hand, when hydrogen iodide hydrate solutions are used in such a process, as in Examples 5 through 7, there is no methyl acrylate produced and there is no iodine in the products. It further appears that when hydrogen iodide hydrate solutions are used as the catalyst there is no iodine produced or involved in the process at any point as was demonstrated in Example 8. Thus, the disadvantages of the prior art catalysts are eliminated, and the desired process becomes commercially feasible. Another difference not mentioned before is that the spontaneous ignition temperature of the reaction mixture is raised 10° to 20° when hydrogen iodide hydrate is used as the catalyst over the spontaneous ignition temperature of the reaction mixture when iodine or anhydrous iodide is used as the catalyst.

The above-described results obtained with the use of hydrogen iodide hydrate solutions are quite unexpected. Methyl esters are readily hydrolyzed as is well known. They are especially easy to hydrolyze in the presence of aqueous mineral acids at elevated tmperatures. It would be expected that the addition of water solutions of hydrogen iodide hydrate to the reactor at elevated temperatures would cause extensive hydrolysis. No such hydrolysis occurs to any extent. In fact, the examples show that less low boiling products are producted with hydrogen iodide hydrate catalyst than with iodine or anhydrous hydrogen iodide catalyst.

It is quite remarkable that upon reacting organic compounds such as methyl isobutyrate in the presence of air and hydrogen iodide hydrate at temperatures above 400°C., no iodine is formed. Under these conditions oxygen selectively reacts with the organic compound to remove hydrogen as water and leaving the hydrogen iodide hydrate unchanged.

The invention has been described in detail with particular reference to preferred embodiments thereof, but it will be understood that variations and modifications can be effected within the spirit and scope of the invention as described hereinabove.

We claim:

1. A method for the oxidative dehydrogenation of at least one organic compound containing at least two adjacent carbon atoms each of which contains at least one hydrogen atom, said compounds being selected from the group consisting of organic esters having the general formula

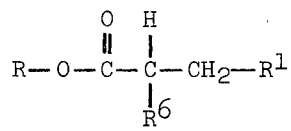

wherein R is alkyl of 1 to 8 carbon atoms, phenyl or cyclohexyl, $R^1$ is hydrogen or alkyl of 1 to 9 carbon atoms, and $R^6$ is hydrogen or alkyl of 1 to 2 carbon atoms; carboxylic acids having the general formula

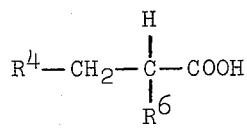

and aliphatic amides having the general formula

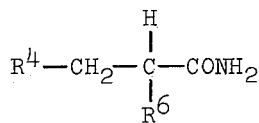

wherein $R^4$ is hydrogen or alkyl of 1 to 9 carbon atoms, and $R^6$ is as defined above; said method comprising heating to a temperature in the range of 300° to 400°C. a reaction mixture comprising said organic compound and from about 0.5 to 10 percent, based on the weight of organic material, of hydrogen iodide as aqueous hydrogen iodide hydrate; introducing said heated mixture into a reaction zone heated to a temperature in the range of about 400° to about 750°C. in the presence of molecular oxygen in a molar ratio of organic compound to oxygen in the range of 1:1 to 10:1 and recovering from the reaction zone ethylenically unsaturated product.

2. In a process according to claim 1, the improvement which comprises separately heating the organic compound to a temperature between 200° and 350°C. whereby said compound is vaporized; separately heating from 0.5 to 10 percent, based on the weight of said organic compound, of hydrogen iodide as aqueous hydrogen iodide hydrate to a temperature between 300° and 400°C.; mixing said heated materials; introducing said heated mixture into a reaction zone heated to a temperature in the range of 400° to 750°C; contacting said heated mixture in said heated reaction zone with molecular oxygen in a molar ratio of organic compound to oxygen in the range of 1:1 to 10:1 and recovering from the reaction zone ethylenically unsaturated product.

3. The method of claim 1 which comprises heating said organic compound and from 0.5 to 10 percent, based on the weight of said organic material, of hydrogen iodide as aqueous hydrogen iodide hydrate separately to a temperature in the range of about 300° to about 400°C., introducting said heated materials into a reaction zone heated to a temperature in the range of about 400° to 750°C. with molecular oxygen in a molar ratio of organic compound to oxygen in the range of 1:1 to 10:1 and recovering from the reaction zone ethylenically unsaturated product.

4. The method according to claim 1 wherein said organic compound is an organic ester having the general formula

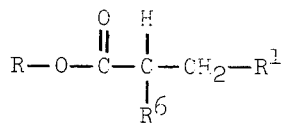

wherein R is alkyl of 1 to 8 carbon atoms, phenyl or cyclohexyl, $R^1$ is hydrogen or alkyl of 1 to 9 carbon atoms, and $R^6$ is hydrogen or alkyl of 1 to 2 carbon atoms.

5. The method according to claim 4 wherein R is alkyl of 1 to 4 carbon atoms and $R^1$ is alkyl of 1 to 9 carbon atoms.

6. The method according to claim 5 wherein said ester is methyl isobutyrate.

7. The method according to claim 1 wherein said organic compound is a carboxylic acid having the formula

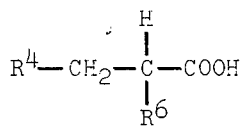

or an aliphatic amide having the formula

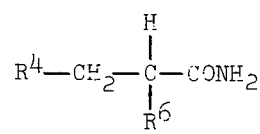

wherein $R^4$ is hydrogen or alkyl of 1 to 5 carbon atoms, and $R^6$ is hydrogen or alkyl of 1 to 2 carbon atoms.

8. The method according to claim 7 wherein said organic compound is isobutyric acid.

9. The method according to claim 7 wherein said organic compound is propionic acid.

10. The method according to claim 3 wherein said organic compound is an organic ester having the general formula

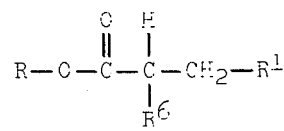

wherein R is alkyl of 1 to 8 carbon atoms, phenyl or cyclohexyl, $R^1$ is hydrogen or alkyl of 1 to 9 carbon atoms, and $R^6$ is hydrogen or alkyl of 1 to 2 carbon atoms.

11. The method according to claim 10 wherein R is alkyl of 1 to 4 carbon atoms and $R^1$ is alkyl of 1 to 9 carbon atoms.

12. The method according to claim 11 wherein said ester is methyl isobutyrate.

13. The method according to claim 3 wherein said organic compound is a carboxylic acid having the formula

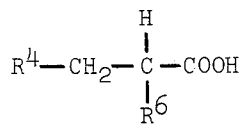

or an aliphatic amide having the formula

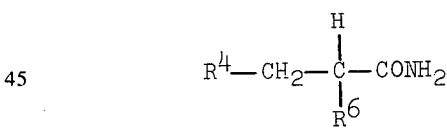

wherein $R^4$ is hydrogen or alkyl of 1 to 5 carbon atoms, and $R^6$ is hydrogen or alkyl of 1 to 2 carbon atoms.

14. The method according to claim 13 wherein said organic compound is isobutyric acid.

15. The method according to claim 13 wherein said organic compound is propionic acid.

* * * * *